(12) United States Patent
Ghannam et al.

(10) Patent No.: US 10,599,152 B2
(45) Date of Patent: Mar. 24, 2020

(54) EARTHQUAKE EMERGENCY MANAGEMENT SYSTEM FOR AUTOMOTIVE VEHICLES

(71) Applicant: FORD GLOBAL TECHNOLOGIES, LLC, Dearborn, MI (US)

(72) Inventors: Mahmoud Y. Ghannam, Canton, MI (US); Brian G. Bennie, Sterling Heights, MI (US); David J. Tippy, Ann Arbor, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 95 days.

(21) Appl. No.: 15/894,022

(22) Filed: Feb. 12, 2018

(65) Prior Publication Data

US 2019/0250621 A1     Aug. 15, 2019

(51) Int. Cl.
*G05D 1/02* (2020.01)
*G01C 21/34* (2006.01)
(Continued)

(52) U.S. Cl.
CPC ....... *G05D 1/0214* (2013.01); *G01C 21/3415* (2013.01); *G01C 21/3461* (2013.01);
(Continued)

(58) Field of Classification Search
CPC .. G05D 1/0214; G01C 21/3461; G08B 21/10; G01V 1/008; H04Q 1/11; H04Q 1/112;
(Continued)

(56) References Cited

U.S. PATENT DOCUMENTS 5,563,575 A * 10/1996 Yamamura ............... B60Q 1/44
                                                    340/429
8,044,772 B1 * 10/2011 Roe ........................ B60K 28/06
                                                    180/272
(Continued)

FOREIGN PATENT DOCUMENTS

CN      103559774 A    2/2014
CN      105913677 A    8/2016
(Continued)

OTHER PUBLICATIONS

Jennifer A. Strauss and Richard M. Allen, Benefits and Costs of Earthquake Early Warning, Seismological Research Letters, vol. 87, No. 3, May/Jun. 2016, pp. 765-772.

*Primary Examiner* — Thomas G Black
*Assistant Examiner* — Sara J Lewandroski
(74) *Attorney, Agent, or Firm* — Frank L. Lollo; MacMillan, Sobanski & Todd, LLC

(57) ABSTRACT

Methods and apparatus for automotive vehicles respond to earthquake warnings to provide occupant awareness of potential hazards while taking autonomous actions such as slowing the vehicle, navigating to a safe location, and providing safety advice. Data gathered by the vehicle can be sent wirelessly to a remote center for coordinating emergency response using the data. The vehicle preferably comprises a powertrain, a plurality of vehicle accessory systems, and an emergency management controller. The controller is adapted to receive an earthquake warning message. The controller responds to the warning message by providing a power conservation command to at least one accessory system to reduce power consumption by at least one respective noncritical accessory function. In addition, it evaluates a vehicle mobility status and automatically launches a corresponding safety measure.

21 Claims, 7 Drawing Sheets

(51) Int. Cl.
*G08G 1/00* (2006.01)
*G08B 21/10* (2006.01)
*H04W 52/00* (2009.01)
*G06F 1/00* (2006.01)
*H04W 4/90* (2018.01)
*H04W 4/44* (2018.01)

(52) U.S. Cl.
CPC .............. *G06F 1/00* (2013.01); *G08B 21/10* (2013.01); *G08G 1/22* (2013.01); *H04W 4/90* (2018.02); *H04W 52/00* (2013.01); *H04W 4/44* (2018.02)

(58) Field of Classification Search
CPC . H04W 4/90; H04W 4/46; G08G 1/20; G08G 1/205; G08G 1/207; G08G 1/22
See application file for complete search history.

(56) References Cited

U.S. PATENT DOCUMENTS

| | | | | |
|---|---|---|---|---|
| 8,519,860 B2 * | 8/2013 | Johnson | ............... | G08B 27/006 340/500 |
| 9,207,338 B2 | 12/2015 | Williams | | |
| 2006/0273884 A1 * | 12/2006 | Watkins | ............... | G08B 25/007 340/425.5 |
| 2008/0004790 A1 * | 1/2008 | Ames | ................. | G01C 21/3461 701/117 |
| 2009/0210152 A1 * | 8/2009 | Kawa | ..................... | G01C 21/32 701/532 |
| 2009/0243845 A1 * | 10/2009 | Kagawa | ................. | G08B 7/066 340/540 |
| 2010/0150122 A1 * | 6/2010 | Berger | .................... | H04W 4/90 370/338 |
| 2010/0153107 A1 * | 6/2010 | Kawai | ................ | G06F 17/2715 704/240 |
| 2011/0196545 A1 * | 8/2011 | Miwa | .................... | B60L 53/305 700/292 |
| 2011/0241877 A1 * | 10/2011 | Wedig | .................... | G08B 7/066 340/540 |
| 2012/0078509 A1 * | 3/2012 | Choi | .................. | G01C 21/3415 701/423 |
| 2013/0033603 A1 * | 2/2013 | Suzuki | ..................... | G08G 1/04 348/148 |
| 2014/0368341 A1 * | 12/2014 | Williams | ............... | G01V 1/008 340/540 |
| 2015/0058651 A1 * | 2/2015 | Choi | .................... | G06F 1/3215 713/324 |
| 2015/0256276 A1 * | 9/2015 | Jones | ..................... | H04H 20/59 455/3.01 |
| 2016/0164619 A1 * | 6/2016 | Sennett | ................... | H04W 4/90 455/404.1 |
| 2016/0249194 A1 | 8/2016 | Miyata et al. | | |
| 2017/0192428 A1 * | 7/2017 | Vogt | ..................... | G05D 1/0238 |
| 2018/0011485 A1 * | 1/2018 | Ferren | .................. | G05D 1/0022 |
| 2018/0260485 A1 * | 9/2018 | Nakata | .................. | H04L 67/025 |
| 2019/0109932 A1 * | 4/2019 | Higgins | ................. | H04W 4/02 |
| 2019/0132701 A1 * | 5/2019 | Choi | ..................... | H04W 4/024 |
| 2019/0135231 A1 * | 5/2019 | Sakuma | ................. | B60R 25/305 |
| 2019/0141603 A1 * | 5/2019 | Vulgarakis Feljan | ....................... | H04W 8/082 |
| 2019/0147260 A1 * | 5/2019 | May | .................... | G06K 9/00825 382/103 |
| 2019/0204101 A1 * | 7/2019 | Macrae | ............. | G01C 21/3446 |

FOREIGN PATENT DOCUMENTS

| | | |
|---|---|---|
| DE | 102015013815 A1 | 4/2017 |
| DE | 102016011837 A1 | 5/2017 |
| JP | 2007206915 A * | 8/2007 |
| JP | 2007206915 A | 8/2007 |
| JP | 2013148946 A | 8/2013 |
| JP | 2015153019 A | 8/2015 |

* cited by examiner

Earthquake Tips

Pull Over To Safe Location As Soon As Possible
- Avoid Trees, Buildings, Being On Or Under Overpasses Or Bridges

Turn OFF Your Car And Set The Parking Brake
- Cover You Head With Your Arms Until Shaking Stops

Once It's Over – Drive Cautiously
- Aftershocks Vary In Size And Timing
- Expect Outages Of Traffic Signals
- Watch For Damaged Roads, Bridges, Overpasses

| Debris Fallen On You? | Near A Coast? |
|---|---|
| • Wait For Help<br>• If Power-Line, Stay In Car<br>• If Hidden, Use Horn | • Listen To Radio For Tsunami Warnings And Evacuation Routes |

Fig. 5

EARTHQUAKE EMERGENCY MANAGEMENT SYSTEM FOR AUTOMOTIVE VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to an earthquake response system, and, more specifically, to emergency management apparatus and methods in a personal automotive vehicle for mitigating harmful effects to the vehicle and its occupants and for assisting in data gathering at a central emergency response center.

Earthquake monitoring is of great interest to public safety and scientific explorations. Traditional detection systems have employed relatively expensive specialized sensing and communication systems. Availability of power and other factors have slowed the widespread deployment of sensing stations. Nevertheless, wireless sensor networks (WSNs) are becoming available possessing the ability to detect the onset of an earthquake and quickly spread a warning to other areas before the shocks arrive. It would be desirable to overcome the sparsity of sensing stations in some areas caused by limitations in access to communications and power by providing additional sources of data to fill in the gaps.

When earthquake warnings are broadcast, the forewarning may arrive from about a few seconds to a few minutes before the large earthquake shocks strike. Due to the speed of human reaction times, it would be desirable to provide automatic safety measures to mitigate the effects of an earthquake wherever possible.

Especially in coastal areas where earthquakes are more prevalent, significant numbers of vehicles are typically present on the roads at all hours of the day. Thus, large numbers of people may be affected who are driving (in either conventional or driverless vehicles) during an earthquake. The people might not become aware of an earthquake early warning (EW). Even if they do receive the EW, they might continue driving into damaged or hazardous areas, such as, into a tunnel, over a bridge, or close to a body of water or a high rise building. Furthermore, they might panic and/or not understand the best actions to take or not to take. Following an earthquake, people might be stranded within their vehicles due to vehicle damage or blocked roads. Outside help may be needed if an occupant is injured or not conscious.

SUMMARY OF THE INVENTION

Due to the increasing availability of electro-mechanical accelerometers, GPS navigation, and wireless communications in modern personal transportation vehicles (e.g., cars and trucks), the vehicles can be enlisted to operate as earthquake sensing "nodes" which can communicate with each other and with a centralized response system. The designated response center can thus obtain a more complete and widespread set of data which improves detection accuracy and response times, so that better warnings can be produced.

For the vehicles linked to the earthquake warning system, the invention performs functions that enhance the safety of occupants and improve rescue efforts in the event of harm. Automatic responses as well as various ways of presenting earthquake response guidance to the vehicle occupants can be undertaken.

In one aspect of the invention, a vehicle comprises a powertrain, a plurality of vehicle accessory systems, and an emergency management controller. The controller is adapted to receive an earthquake warning message. The controller responds to the warning message by providing a power conservation command to at least one accessory system to reduce power consumption by at least one respective non-critical accessory function. In addition, it evaluates a vehicle mobility status and automatically launches a corresponding safety measure.

BRIEF DESCRIPTION OF THE DRAWINGS

FIG. 5 depicts a user guidance screen for display to vehicle occupants as a result of the occurrence or prediction of an earthquake.

DETAILED DESCRIPTION OF PREFERRED EMBODIMENTS

Figure 1:
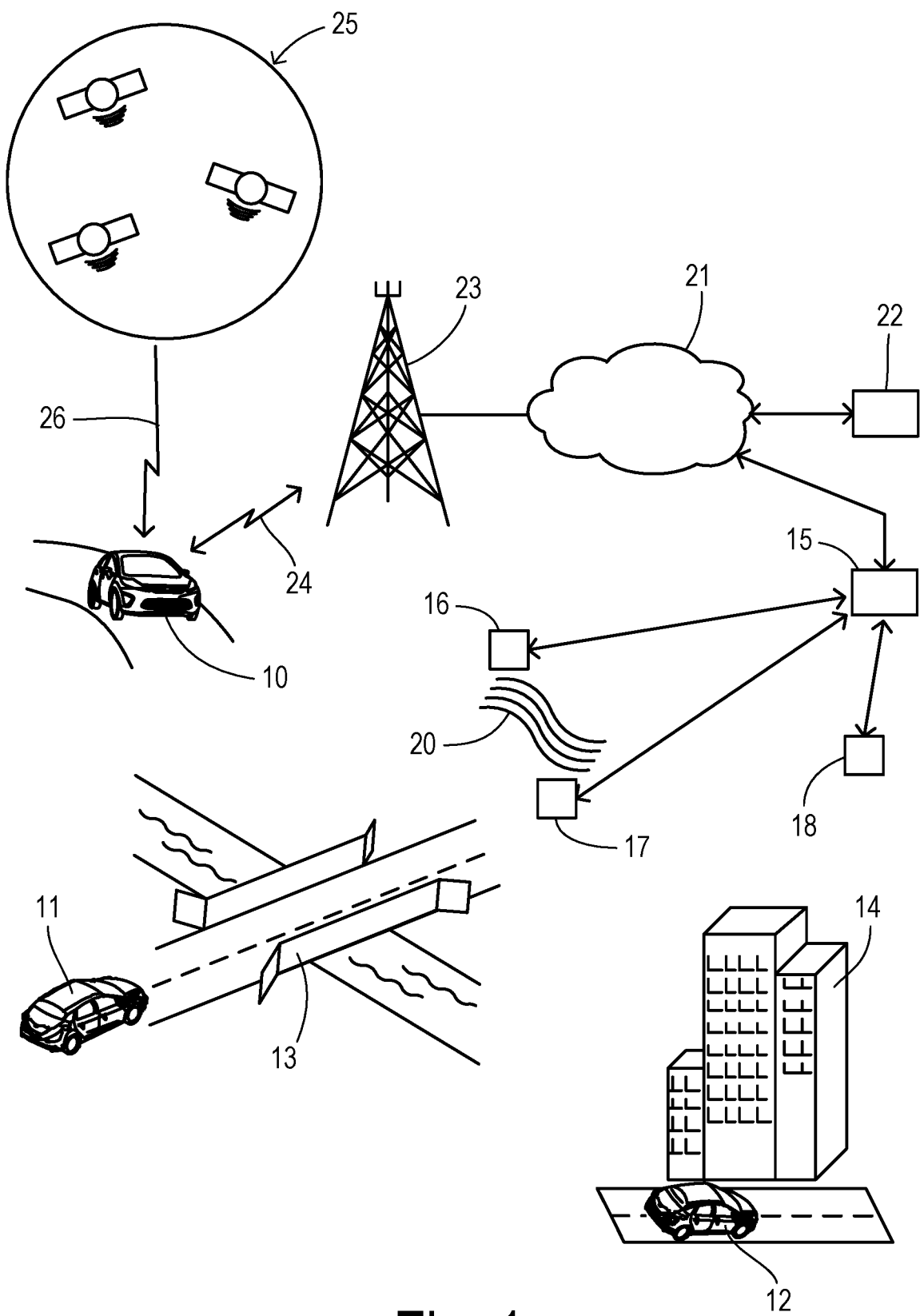
FIG. 1 is a diagram showing interacting elements of an earthquake response system including personal automotive vehicles.

Referring to FIG. 1, vehicles 10, 11, and 12 are being driven within a region covered by an earthquake warning system. In particular, vehicle 11 is approaching a bridge 13 while vehicle 12 is passing a high-rise building 14. An earthquake early warning system has a remote emergency response center 15 connected to a plurality of seismographic sensor stations 16, 17, and 18. Seismographic waves 20 manifested from an earthquake event are detected by sensors 16-18 so that known equipment at emergency response center 15 can quickly estimate the epicenter and the severity of an earthquake. Accordingly, early earthquake warnings may be generated at response center 15 which are disseminated via a cloud network 21 to various locations including first responders 22 (fire and rescue), law enforcement, and other governmental agencies. To distribute early warnings to mobile vehicles, a wireless communication systems such as a vehicle-to-infrastructure (V2I) system includes transmitting station 23 for sending the early warning message over a wireless communication channel 24 to vehicles 10-12. Based on the early warning message, vehicle 11 may avoid driving onto bridge 13 and vehicle 12 may relocate away from building 14, for example. Wireless communication channel 24 preferably carries two-way communications in order to enable data supporting earthquake detection and for evaluating earthquake damage and identifying the need for emergency responses to be transmitted to emergency response center 15 as described below.

A GPS satellite system 25 may provide GPS signals over a wireless channel 26 to vehicles 10-12 in order to monitor geographic coordinates as known in the art.

In general, when an earthquake strikes the cars employing the present invention can either be in a driving state or a parking condition, with or without occupants. A control module, such as the restraints control module (RCM) or any other control module, receives an earthquake warning message. The warning message can be generated by monitoring system in the vehicle, received wirelessly via a vehicle-to-anything (V2X) communication system, or activated manually by the driver. The control module switches the vehicle to an "Emergency-Earthquake Management Mode" to conserve energy by shutting off non-critical features (such as, media entertainment, HVAC climate control, and auxiliary powerpoints). Preferably, the driver can still override the deactivation of desired features.

In a preferred embodiment, the vehicle displays predefined earthquake guidance in the form of safety directions or tips, such as how, where, and when to stop and exit the vehicle (e.g., slow down, avoid bridges, tall buildings, and water banks). The vehicle may also announce via a display, a radio, or text-to-speech system, any additional information or directions that come from the earthquake warning centers.

Figure 2:
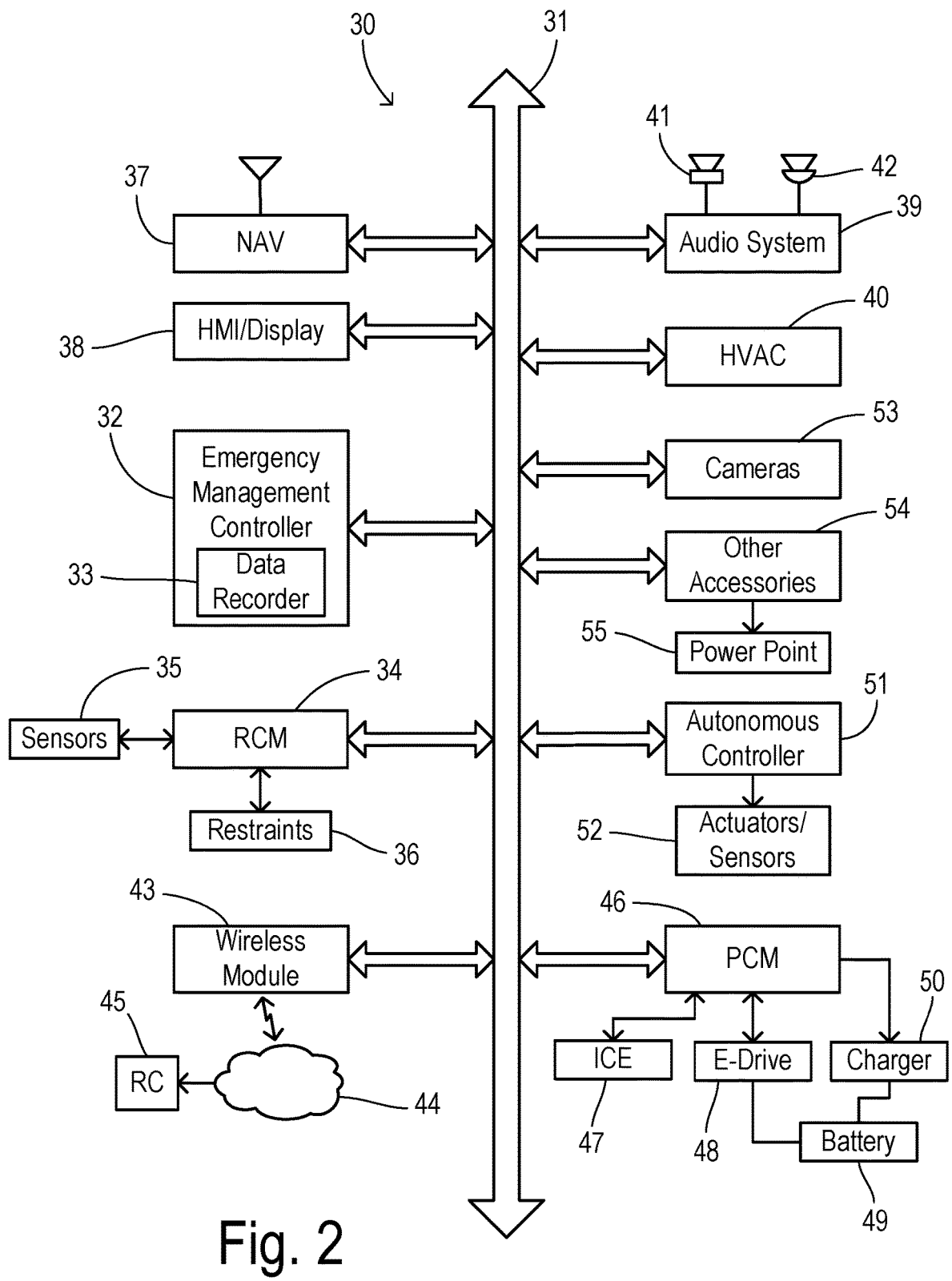
FIG. 2 is a block diagram showing an individual vehicle including an emergency management controller.

FIG. 2 shows a vehicle electronics architecture 30 built around a multiplex bus 31 providing high-speed data and control communications capabilities between different electrical subsystems. As used herein, "accessory system" can refer to any of the electrical/electronic subsystems in architecture 30. An emergency management controller 32 connected to bus 31 comprises a data recorder 33 and includes other typical components such as a programmable microprocessor. Although shown as a separate module, the emergency management manager controller function can be co-located in other modules such as in a restraints control module (RCM) 34.

RCM 34 is connected to bus 31 and to associated crash sensors 35 (e.g., accelerometers) and associated restraints 36 (e.g., airbags and seat belt pre-tensioners). Other common components such as a navigation module 37, a human machine interface (HMI) display 38, an audio system 39, and an HVAC climate control system 40 are all connected to bus 31. Audio system 39 may be connected to a speaker system 41 for reproducing media entertainment content and a microphone 42 for receiving spoken commands from a driver.

A wireless communication module 43 (e.g., a vehicle-to-anything or V2X transceiver) connected to bus 31 is in wireless communication with an offboard cloud infrastructure 44 which further connects to an emergency response center 45. The vehicle includes a powertrain having a powertrain control module (PCM) 46 connected to bus 31. PCM 46 may interface with an internal combustion engine 47 and/or an electric drive 48. An electric or hybrid vehicle embodiment would include a battery 49 and a battery charger 50 which is also connected to PCM 46, according to any known vehicle powertrain architecture. The vehicle can be comprised of an autonomous (driverless) vehicle by having an autonomous controller 51 connected to bus 31 and to a plurality of associated actuators and sensors 52 as known in the art.

In addition to dedicated sensors such as restraint sensors 35, the vehicle may include other shared or centralized sensors for supporting various vehicle functions, such as cameras 53 coupled to bus 31. Cameras 53 may include roof-mounted cameras, other 360° cameras, and forward, side, backward, and interior-looking cameras for capturing either visible or infrared light images. They can further include radar echo-detection sensors, LiDAR systems, and other remote sensing systems as known in the art. Relevant sensors can further include ambient air temperature sensors in HVAC 40.

The vehicle may include various other accessory systems 54 connected to bus 31 which all consume electrical power when performing a variety of both critical and noncritical accessory functions. For example, a power point 55 may be provided for connecting smart phones or other devices for sharing data and/or electrical power.

Data recorder 33 may access various vehicle parameters including vibrations experienced by the vehicle as measured by sensors 35 and both internal and external images from cameras 53. Recorded data can be used both internally for detecting earthquakes and evaluating vehicle status and externally for transmitting the data remotely to response center 45 in order to assist in detecting and quantifying earthquake events and the resulting damages caused.

Figure 3:
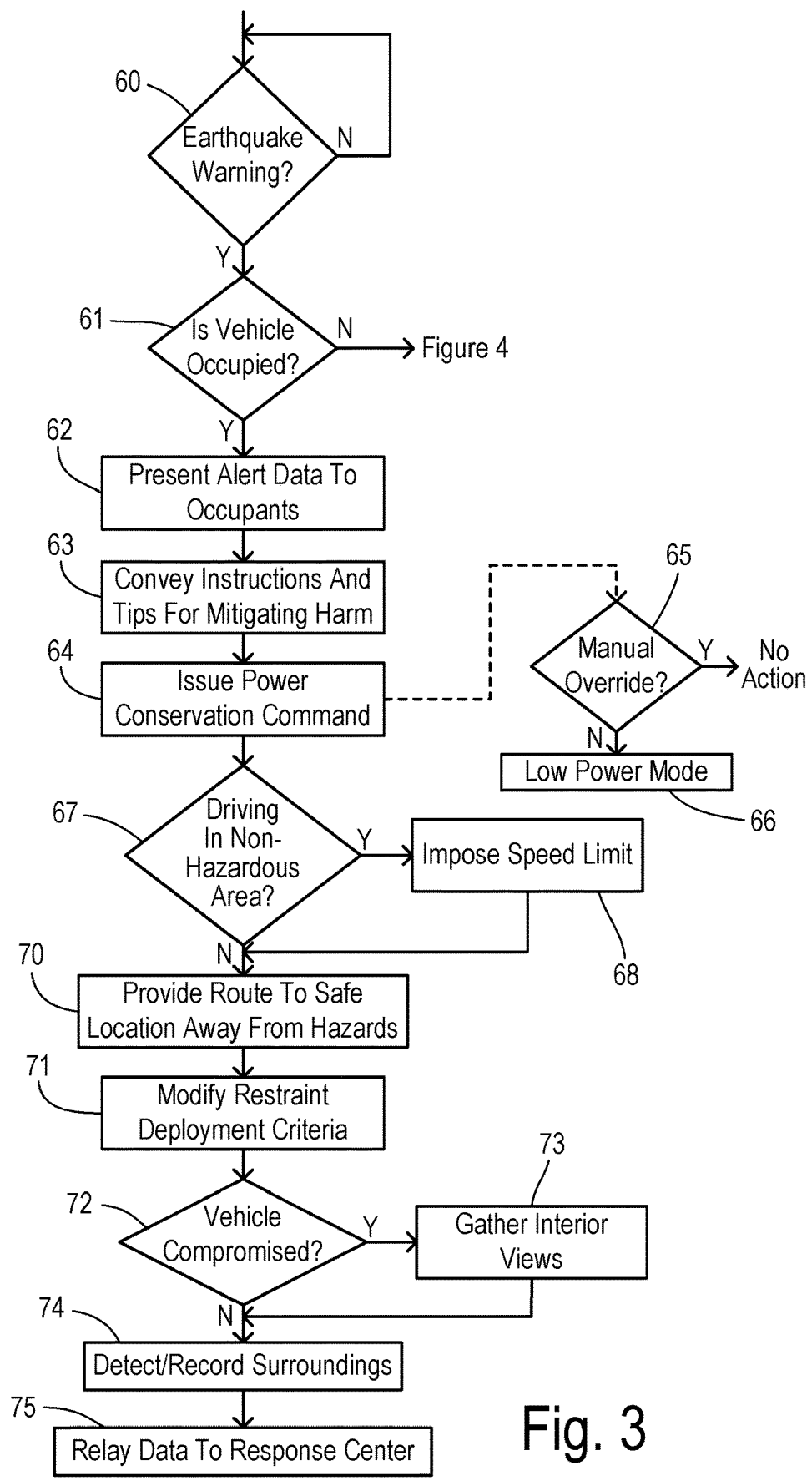
FIGS. 3 and 4 are flowcharts showing one preferred method of the invention.

FIG. 3 shows one preferred method of the invention wherein a check is performed in step 62 determine whether an earthquake warning message has been received. Earthquake warnings can be initiated as a remotely generated message which is wirelessly transmitted to the vehicle, an internally generated message based on monitoring vibrations using vehicle sensors such as accelerometers in a restraint control system, or as an internally generated message based on an input action initiated by an occupant in the vehicle. When an earthquake warning message has been received, a check is performed in step 61 to determine a vehicle mobility state (e.g., whether the vehicle is occupied and/or whether it is moving). If not occupied, then the method proceeds to steps shown in FIG. 4 as described later. When the vehicle is occupied, then alert data is presented to the occupants in step 62. The alert data may include relevant details about the location, strength, and arrival time of an earthquake event, or it may be just a notification of an earthquake emergency without further details. In any case, the occupants are made aware of the earthquake emergency which is expected to present itself or has already struck, and then the method proceeds to automatically launch one or more other safety measures corresponding to the vehicle mobility status.

The corresponding safety measures can be comprised of providing earthquake response guidance to the vehicle occupant. In step 63, instructions and tips for mitigating harm to the occupants are conveyed using a human machine interface (HMI) in the form of textual and/or graphic displays, audio messages using a text to speech system, or relaying audio information received from the remote emergency response system. FIG. 5 shows one example of a textual display that may be automatically presented to occupants of the vehicle on an instrument panel screen within the vehicle or which may be pushed to personal devices or smart phones using a Bluetooth connection, for example.

In step 64 as part of an emergency management mode, the onboard emergency management system issues a power conservation message to predetermined vehicle accessory systems such as a climate control system, audio system, or any other vehicle system having noncritical accessory functions. By conserving power/fuel, a vehicle may maintain an increased capacity for moving out of a hazardous area and for otherwise extending the time of availability for vehicle systems supporting the needs of the occupants. Within the respective accessory systems receiving the power conservation command, a check may be performed in step 65 to determine whether a vehicle occupant (e.g., the driver) has generated an override command in order to continue using the noncritical function. If so, then no action is taken; otherwise a low-power mode is entered in step 66 for the respective accessory system. Examples of noncritical functions and their low-power mode include 1) air-conditioning provided by an HVAC climate control system wherein the cooling is reduced or turned off, 2) music being reproduced by a media player wherein the audio output is reduced or turned off, 3) videos being shown on a rear entertainment system which is deactivated, and 4) supplying power to an auxiliary power point which would also be deactivated.

In step 67, the emergency management controller performs a check to determine whether the vehicle is moving and is located in a nonhazardous area. As used herein, a nonhazardous area may include a roadway traversing or proximate to a bridge or overpass, near high-rise buildings, or near bodies of water. When the vehicle is not driving in a particularly hazardous area, then a corresponding safety measure includes imposing a speed limit on vehicle motion in step 68. The reduction in speed is meant to lessen the risk of loss of control or significant collisions if shaking begins before the vehicle comes to a stop. When in a hazardous area, however, the maximum vehicle speed may be reduced less or not at all so that the vehicle can first proceed out of the hazardous area.

As another corresponding safety measure automatically launched when the vehicle is occupied and being driven, the emergency management controller may obtain or calculate a route to a safe location away from nearby hazards in step 70. In the event that the vehicle is not self-driven and includes a navigation system which the driver is actively using to follow a predetermined route to a destination, then the invention may use the navigation system to present earthquake response guidance in the form of a modified route. In the event that the vehicle is an autonomous vehicle proceeding along a route without active driver control, then a revised route may be automatically adopted which includes altered road segments to avoid potential hazards; or in the event that the current destination is deemed unsafe, then the driver may be informed to select a new destination.

A further safety measure in step 71 includes modifying restraint deployment criteria to account for vehicle accelerations that may be due to ground shaking rather than an actual impact. For example, thresholds may be adjusted which are used for comparing with acceleration profiles to detect impact events for which airbag deployments should be triggered, or the accelerations signals themselves may be filtered according to a filtering function which compensates for potential earthquake signatures in the acceleration data.

Figure 6:
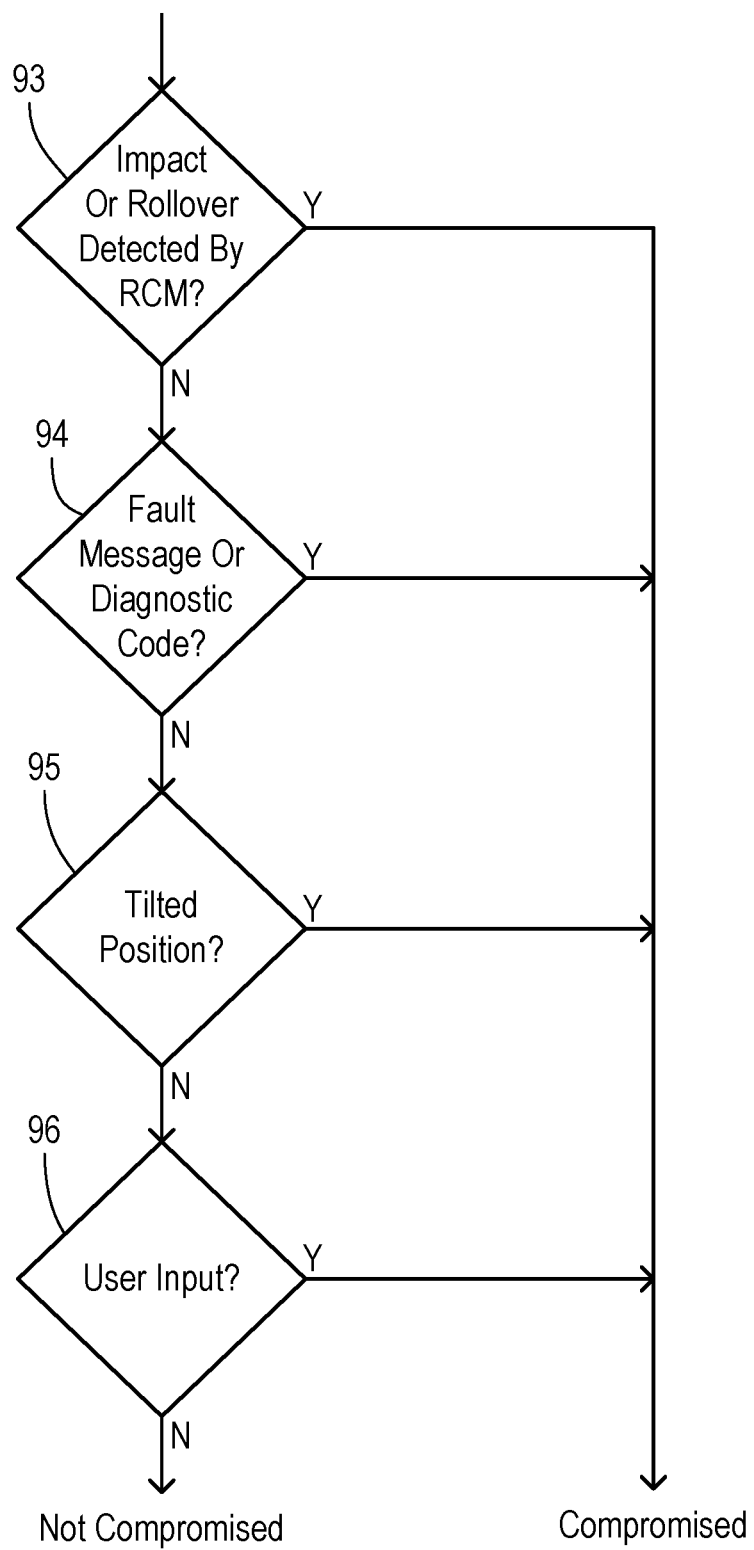
FIG. 6 is a flowchart showing one preferred method for determining whether an individual vehicle is in distress after an earthquake.

Another earthquake response safety measure involves pushing data from the vehicle to the remote response center and/or to other nearby vehicles. Data collected by the response center can support its analysis of the extent and location of earthquake damage and can identify and prioritize specific incidents where rescue assistance may be required. Thus, in step 72 a check is performed to determine whether the vehicle is in a compromised state (i.e., has been in a crash, is impaired by debris, or trapped in a precarious position). If the vehicle is compromised, then interior camera views are gathered in step 73 to show the status of the vehicle occupants and interior vehicle systems. FIG. 6 shows a preferred method for determining whether the vehicle state is compromised or not compromised. In step 93, a check is performed to determine whether there has been an impact or rollover detected by the restraints control module. If not, then a check is performed in step 94 to determine whether a fault message or other diagnostic code has been generated in the vehicle indicative of a serious problem to be addressed. If not, then a check is performed in step 95 to determine whether the vehicle is in a tilted position which may indicate the vehicle has fallen into a precarious situation. A tilted state of the vehicle can be determined using the RCM sensors, fluid level sensors in various systems (e.g., fuel tank or window washer reservoir), or other onboard sensors as known in the art. If not tilted, then a check is performed in step 96 to determine whether a user has generated an input signal indicating that the vehicle is compromised or that help is requested for a rescue. An affirmative answer in any of steps 93-96 results in detecting a compromised state. Otherwise, the state is not compromised.

In step 74, exterior camera views and other data such as acceleration data, air temperature, or other relevant measures are detected and recorded by the emergency management controller. In step 75, all the gathered/recorded data is relayed to the response center.

Figure 4:
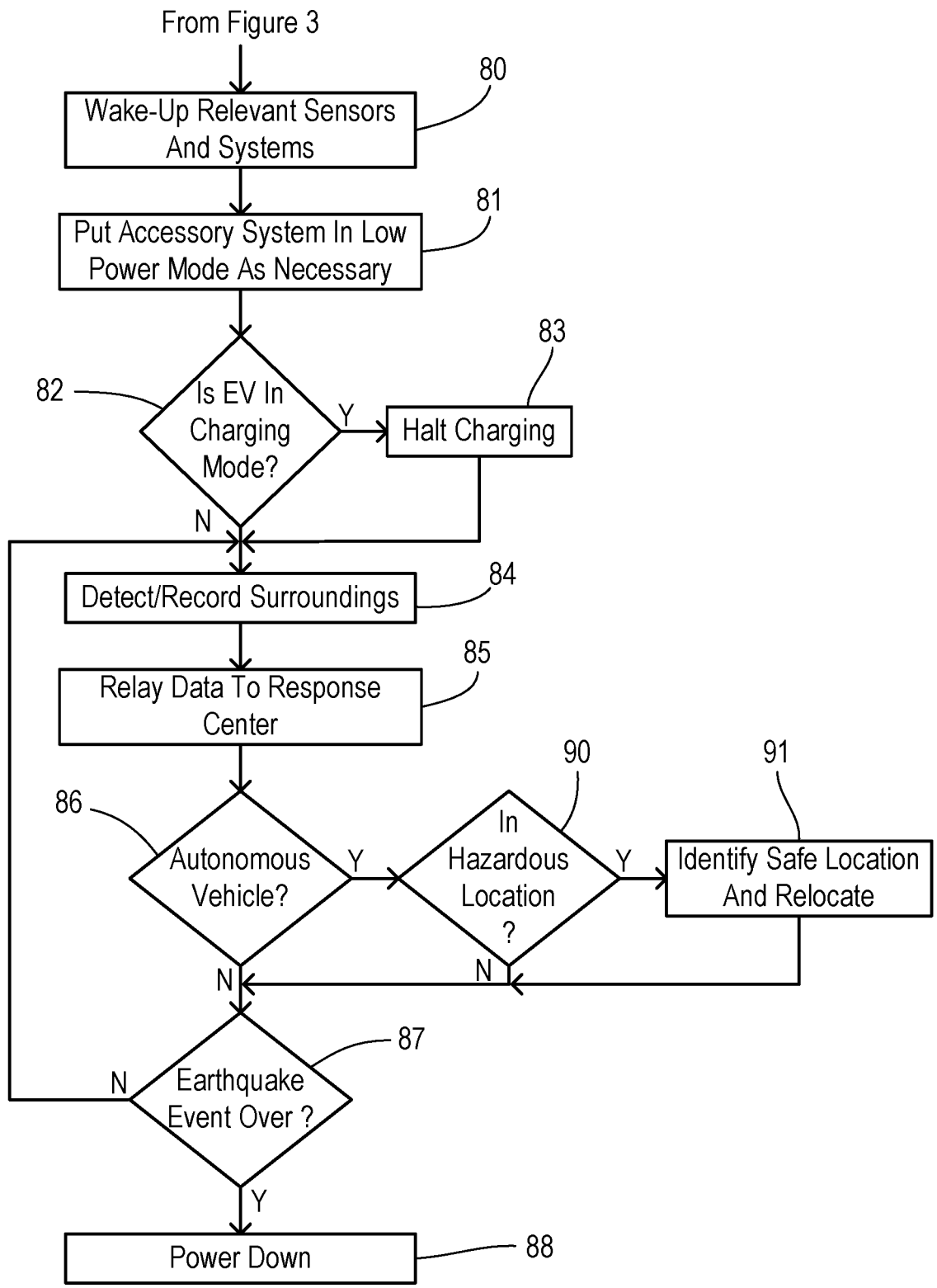

When the vehicle mobility status from step 61 determined that the vehicle is not occupied, then the preferred method proceeds according to the steps shown in FIG. 4. In step 80, relevant sensors and systems are woken up in response to reception of the earthquake warning message. In step 81, predetermined accessory systems deemed relevant (e.g., a lane-keeping system having a camera to be used for gathering pictures around the vehicle) and for which only partial functionality is needed are put in a low-power mode wherein portions of the accessory systems not needed for performing the earthquake emergency functions are not energized.

In step 82, a check is performed to determine whether the vehicle is an electric vehicle and is currently in a charging mode. If so, then charging is halted in step 83 in order to avoid potential damage that could be caused by disruption of electrical conductors by the earthquake.

In step 84, the earthquake emergency management controller detects and records the surroundings including interior and/or exterior pictures and other relevant data such as accelerometer measurements from the RCM and air temperature measurements from an HVAC system. The data is relayed to a response center in step 85.

A check is performed in step 86 to determine whether the vehicle is an autonomous, self-driving vehicle. If not, then the method checks whether the earthquake event has ended in step 87. If not, then the return is made to step 84 to continue to detect, record, and relay data. If the earthquake event is over, then the method proceeds to step 88 and the vehicle powers back down.

In the event that a vehicle is an autonomous vehicle, then a check is performed in step 92 determine whether the autonomous vehicle is parked in a hazardous location. Hazardous locations may include a parking structure, a covered garage, or other situations with a high likelihood of harm such as near a body of water. If in a hazardous location, then the autonomous vehicle identifies a nearby safe location in step 91 and automatically relocates the vehicle to the safe location. For example, a vehicle parked in a parking structure may automatically relocate to a position outside the parking structure by calculating an appropriate route to a safe destination and then activating the powertrain and autonomous controller to execute the route.

Figure 7:
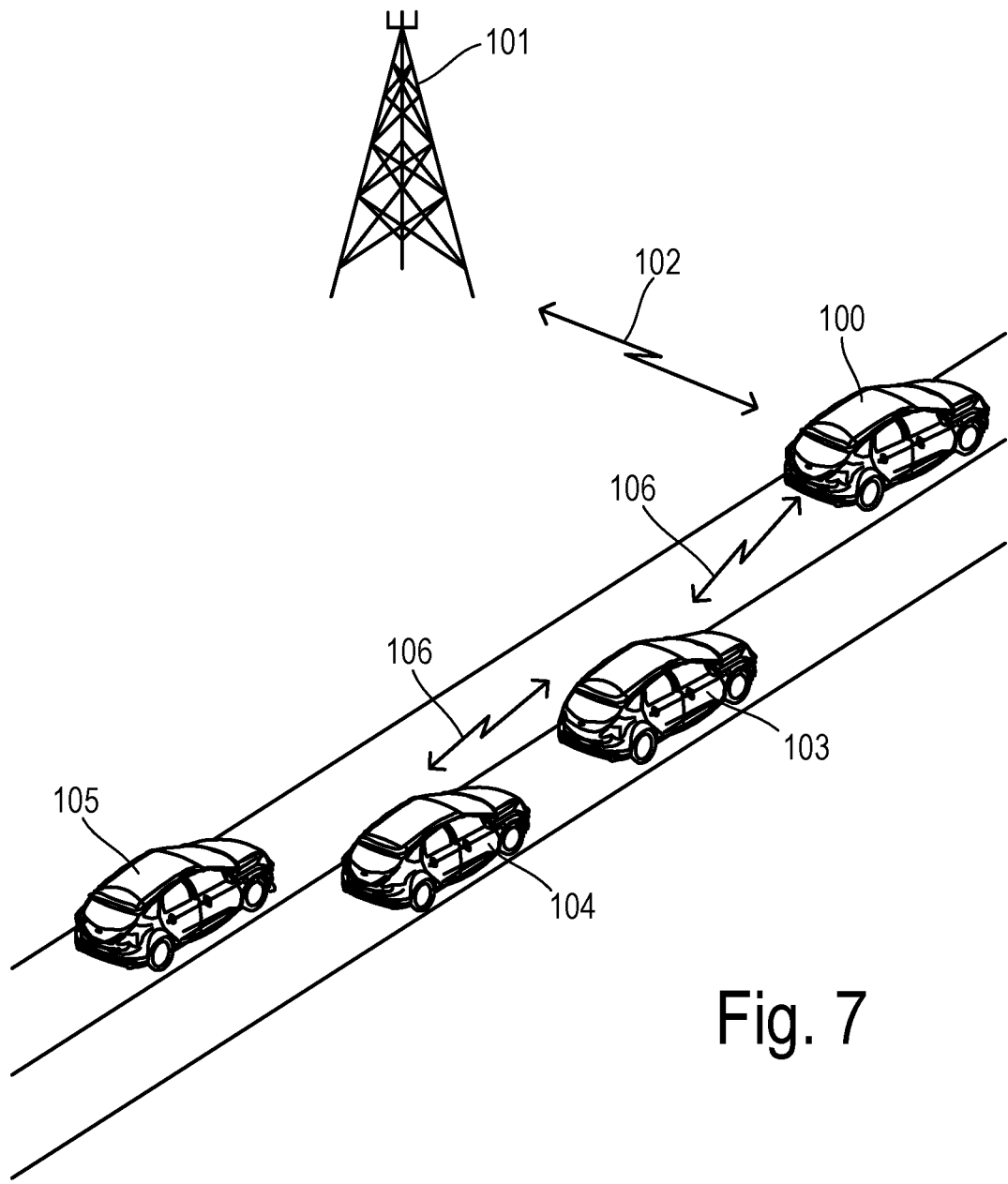
FIG. 7 is a diagram showing a group of vehicles having coordinated operations while moving to a safe location after an earthquake.

FIG. 7 shows another feature of the invention for conserving power among a group of vehicles during an emergency. By platooning groups of vehicles for coordinated response following an earthquake it also becomes possible to achieve more efficient relocation of vehicles in an orderly fashion. Thus, a lead vehicle 100 is in communication with a cloud/response center via a base station 101 providing a V2I communication channel 102. Lead vehicle 100 consumes power in connection with obtaining routing instructions and other information regarding the earthquake hazards from the response center and in connection with collecting and transmitting data to the response center characterizing conditions around vehicle 100. A plurality of platooned vehicles 103, 104, and 105 are in communication with lead vehicle 100 over a V2V communication channel 106 to receive the routing instructions and information. Consequently, vehicles 103, 104, and 105 have a reduced energy consumption compared to what they would consume if directly interacting with the response center. Vehicles 103, 104, and 105 can simply follow lead vehicle 100 or, alternatively, they can independently execute the shared route. In the event that power or communication capability of lead vehicle 100 becomes compromised, then one of the other vehicles can take over as the lead so that it becomes the only vehicle interacting directly with the response center.

What is claimed is:

1. An automotive vehicle comprising:
   a powertrain;
   a plurality of vehicle accessory systems;
   an autonomous control system for self-driving of the vehicle to a programmable destination; and
   an emergency management controller adapted to receive an earthquake warning message, wherein the management controller responds to the warning message by providing a power conservation command to at least one accessory system to reduce power consumption by at least one respective noncritical accessory function to increase a capacity of the vehicle to move out of a hazardous area, evaluating a vehicle mobility status, and automatically launching a corresponding safety measure;
   wherein when the mobility status corresponds to the vehicle being parked in a hazardous surrounding and without containing occupants then the corresponding safety measure includes activating the powertrain and setting the programmable destination to a predetermined safe location.

2. The vehicle of claim 1 further comprising:
   a data recorder collecting vehicle status information from the accessory systems; and
   a wireless communication system, wherein the safety measure is comprised of transmitting vehicle status information from the data recorder to a remote emergency response center;
   wherein the status information includes camera images depicting an external scene gathered to show local damage outside of the vehicle following an earthquake.

3. The vehicle of claim 1 wherein the emergency management controller is configured to coordinate with nearby vehicles over a vehicle-to-vehicle communication channel to form a platoon so that at least one vehicle communicates with a response center only indirectly through another one of the vehicles.

4. The vehicle of claim 1 further comprising:
   a navigation system for guiding the vehicle to a programmable destination;
   wherein when the mobility status corresponds to the vehicle being in motion then the corresponding safety measure includes updating a route being followed to the programmable destination in order to avoid predetermined hazardous surroundings.

5. The vehicle of claim 1 wherein the mobility status includes an occupied status, and wherein the corresponding safety measure includes presenting earthquake response guidance to an occupant of the vehicle.

6. The vehicle of claim 5 wherein the response guidance includes route instructions to a location free of predetermined earthquake hazards.

7. The vehicle of claim 5 wherein the response guidance includes personal instruction tips other than route instructions to mitigate harm caused by an earthquake.

8. The vehicle of claim 1 wherein the noncritical accessory function is comprised of at least one of a media entertainment function, an HVAC function, and a power point function.

9. The vehicle of claim 1 wherein the emergency management controller and the accessory systems are adapted to negate the power conservation command in response to a manual override.

10. The vehicle of claim 1 wherein when the mobility status corresponds to the vehicle being in motion on a roadway which is clear of a hazardous feature, then the corresponding safety measure includes imposing a predetermined speed limit on the motion.

11. A vehicle comprising:
    a powertrain;
    a plurality of vehicle accessory systems;
    an emergency management controller adapted to receive an earthquake warning message, wherein the management controller responds to the warning message by providing a power conservation command to at least one accessory system to reduce power consumption by at least one respective noncritical accessory function, evaluating a vehicle mobility status, and automatically launching a corresponding safety measure;
    a data recorder collecting vehicle status information from the accessory systems; and
    a wireless communication system, wherein the safety measure is comprised of transmitting vehicle status information from the data recorder to a remote emergency response center;
    wherein the emergency management controller evaluates the mobility status using the vehicle status information to detect a compromised status, and wherein when the compromised status is detected then the transmitted status information includes camera images depicting an internal scene within the vehicle following an earthquake.

12. A vehicle comprising:
    a powertrain;
    a plurality of vehicle accessory systems;
    an emergency management controller adapted to receive an earthquake warning message, wherein the management controller responds to the warning message by providing a power conservation command to at least one accessory system to reduce power consumption by at least one respective noncritical accessory function, evaluating a vehicle mobility status, and automatically launching a corresponding safety measure; and
    a passenger restraint system generating a deployment signal in response to a measured acceleration of the vehicle and coupled to the emergency management controller for receiving the warning message, wherein a criteria applied to the measured acceleration in order to identify conditions for generating the deployment signal is adjusted to compensate for potential earthquake-based accelerations in response to the warning message.

13. A vehicle comprising:
a powertrain, wherein the powertrain includes a battery which is connectable to a power grid for charging the battery;
a plurality of vehicle accessory systems;
an emergency management controller adapted to receive an earthquake warning message, wherein the management controller responds to the warning message by providing a power conservation command to at least one accessory system to reduce power consumption by at least one respective noncritical accessory function, evaluating a vehicle mobility status, and automatically launching a corresponding safety measure, wherein the safety measure includes halting the charging of the battery.

14. An earthquake response method for a vehicle having a powertrain and a plurality of vehicle accessory systems, wherein the vehicle includes an autonomous control system for self-driving the vehicle to a programmable destination, the method comprising the steps of:
receiving an earthquake warning message;
providing a power conservation command to at least one accessory system to reduce power consumption by at least one respective noncritical accessory function;
evaluating a vehicle mobility status; and
automatically launching a corresponding safety measure, wherein when the mobility status corresponds to the vehicle being parked in a hazardous surrounding and without containing occupants then the corresponding safety measure is comprised of activating a vehicle powertrain and setting the programmable destination to a predetermined safe location.

15. The method of claim 14 wherein when the mobility status corresponds to the vehicle being in motion then the corresponding safety measure includes updating a route being followed to the programmable destination in order to avoid predetermined hazardous surroundings.

16. The method of claim 14 wherein when the mobility status corresponds to the vehicle being in motion on a roadway which is clear of a hazardous feature, then the corresponding safety measure includes imposing a predetermined speed limit on the motion.

17. The method of claim 14 further comprising the step of:
collecting vehicle status information from the accessory systems;
wherein the safety measure is comprised of wirelessly transmitting vehicle status information to a remote emergency response center, wherein the status information includes camera images depicting an external scene gathered to show local damage outside of the vehicle following an earthquake.

18. The method of claim 17 wherein the evaluating step includes analyzing the vehicle status information to detect a compromised status;
wherein when the compromised status is detected then the transmitted status information includes camera images depicting an internal scene within the vehicle following an earthquake.

19. The method of claim 14 wherein the mobility status includes an occupied status, wherein the corresponding safety measure includes presenting earthquake response guidance to an occupant of the vehicle, and wherein the response guidance includes at least one of i) route instructions to a location free of predetermined earthquake hazards, and ii) personal instruction tips to mitigate harm caused by an earthquake.

20. The method of claim 14 wherein the noncritical accessory function is comprised of at least one of a media entertainment function, an HVAC function, and a power point function.

21. The method of claim 20 further comprising the step of negating the power conservation command of a selected noncritical function in response to a manual override.

* * * * *